April 6, 1943. T. D. BARNES 2,315,579
ELECTRICAL MEASURING DEVICE
Filed Jan. 7, 1942

WITNESSES:
E. A. McCloskey.
C. L. Friedman

INVENTOR
Thomas D. Barnes
BY
ATTORNEY

Patented Apr. 6, 1943

2,315,579

UNITED STATES PATENT OFFICE 2,315,579

ELECTRICAL MEASURING DEVICE

Thomas D. Barnes, West Orange, N. J., assignor to Westinghouse Electric & Manufacturing Company, East Pittsburgh, Pa., a corporation of Pennsylvania Application January 7, 1942, Serial No. 425,963

5 Claims. (Cl. 171—264)

This invention relates to electromotive devices, and it has particular relation to electrical measuring devices having moving parts subject to undesired forces varying as functions of temperature.

In electromotive devices moving parts are employed which are provided with suitable bearing means. For example, an induction watthour meter includes an armature structure which is mounted for rotation in suitable top and bottom bearings. One of the best bottom bearings available is that employing a steel ball. This bearing requires no lubrication. In accordance with the best modern practice, the top bearing of the induction watthour meter is lubricated. The lubricants commonly employed for this purpose have viscosities which vary as functions of temperature.

Because of the variation in viscosity of the lubricant employed in the top bearing of an induction watthour meter, the lubricant develops a drag or retarding force which acts on the armature structure of the meter to oppose rotation thereof and this retarding force varies in magnitude as a function of temperature. Because of this variation in the retarding force, the adjustment devices conventionally employed for the induction watthour meter are not suitable for compensating this retarding force. Recently suitable compensating means for this purpose has been developed, and such means is disclosed in the copending application of A. J. Petzinger, Serial No. 428,493, filed January 28, 1942, and assigned to the Westinghouse Electric & Manufacturing Company.

The desirability of such compensation will be recognized when it is appreciated that the modern watthour meter often is subjected to a substantial temperature variation. In modern practice many watthour meters are placed outdoors and consequently are subject to atmospheric temperature variations. In such locations it is not uncommon for a watthour meter to be subjected to temperatures ranging from $-20°$ C. to $+50°$ C.

In accordance with this invention simple means are provided for compensating an electromotive device such as an induction watthour meter for errors introduced by the bearing lubricant employed therefor. This compensation may take the form of a magnetic member for modifying the symmetry of the magnetic circuits provided in the watthour meter for voltage magnetic flux. The modification in symmetry of the magnetic circuit is designed to provide an auxiliary force assisting in driving the armature structure of the meter. If the magnetic member is formed of a material having a substantial negative temperature coefficient of permeability it may be proportioned to produce an auxiliary force varying in magnitude with temperature sufficiently to compensate substantially for the retarding force produced by the lubricant.

It is, therefore, an object of the invention to provide an electromotive device having improved means for compensating the device against temperature responsive errors.

It is a further object of the invention to provide a watthour meter having a magnetic member formed of a material having a substantial temperature coefficient of permeability positioned to modify the symmetry of the magnetic path offered to voltage magnetic flux and proportioned to produce an auxiliary force compensating for the effects of the retarding force produced by meter bearing lubricant.

It is another object of the invention to provide an induction watthour meter having a magnetic member formed of material having a substantial negative temperature coefficient of permeability positioned to modify the symmetry of the magnetic paths offered to voltage magnetic flux in order to apply an auxiliary force to the armature structure of the meter and having a light load adjuster operable for adjusting the performance of the meter under light load conditions.

Other objects of the invention will be apparent from the following description taken in conjunction with the accompanying drawing, in which.

Figures 1, 2, 3, 4:
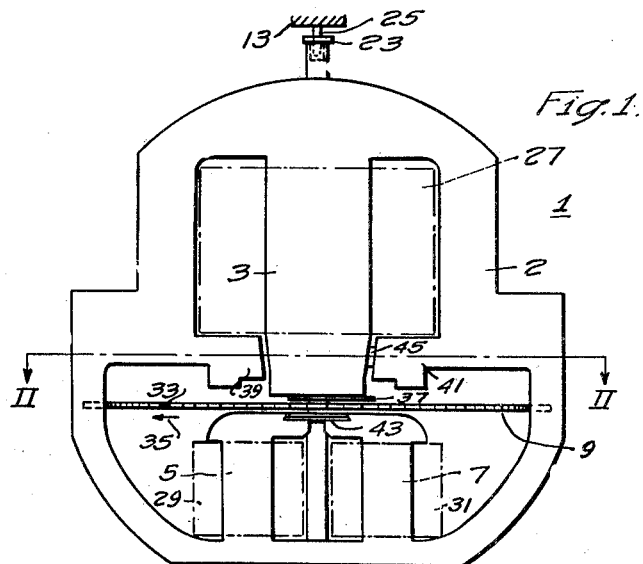
Figure 1 is a view in front elevation of an induction watthour meter embodying the invention.
Fig. 2 is a view in cross section with parts broken away taken along the line II—II of Fig. 1.
Fig. 3 is a graphical representation illustrating the characteristics of the watthour meter shown in Figs. 1 and 2.
Fig. 4 is a graphical representation showing the characteristics of material employed in the watthour meter of Figs. 1 and 2.

Referring to the drawing, Figure 1 shows a watthour meter 1 having a magnetic core 2. This magnetic core 2 includes a voltage pole 3 and current poles 5 and 7 which are spaced to define an air gap. An electroconductive armature structure such as a copper or an aluminum disk 9 is mounted for rotation in this air gap. To this end, the disk 9 may be attached to a shaft 11 which is provided with a top bearing 13 and a bottom bearing 15. Either or both of these bearings may be of the lubricated type. In the specific modification shown in Fig. 1, the bearing 15 is formed of a steel ball 17 which is positioned between a sapphire cup 19 carried by the shaft 11 and a sapphire cup 21 which is attached to a fixed part of the watthour meter. This construction is one of the best available for bottom bearings and operates satisfactorily in a dry or unlubricated condition. The top bearing 13 may be in the form of a collar 23 carried by the shaft 11 and having an orifice for receiving a pin 25 which is attached to a stationary part of the watthour meter.

In accordance with conventional practice, the top bearing 13 is lubricated by means of a suitable lubricant. It has been found that petrolatum constitutes a satisfactory lubricant for this bearing. The lubricant serves not only to decrease wear of the bearing surfaces but it also acts as a cushion to decrease noise and vibration or chatter of the bearing. Suitable constructions for the bearings 13 and 15 are shown in detail in the Paszkowski Patent 1,728,507.

In order to energize the watthour meter 1 a voltage winding 27 is positioned about the voltage pole 3 and current windings 29 and 31 are positioned about the current poles 5 and 7. As well understood in the art, when the windings 27, 29 and 31 are energized in accordance with the voltage and current of an electrical circuit, a shifting magnetic field is established in the air gap containing the disk 9. This shifting magnetic field is dependent upon the energy flowing in the associated electrical circuit and serves to apply a torque to the disk 9 for rotating the disk. A permanent magnet (not shown) conventionally is employed for damping rotation of the disk 9. It will be assumed that the direction of the shifting magnetic field is such that a mark 33 on the edge of the disk 9 moves in the direction of the arrow 35.

In order to adjust the watthour meter 1 for satisfactory operation under light load conditions, an electroconductive loop or plate 37 is positioned for adjustment across the pole face of the voltage pole 3. By proper adjustment of the plate 37, the performance of the watthour meter 1 under light load conditions may be adjusted as desired.

It will be observed that the magnetic core 2 includes a pair of arms 39 and 41 which terminate adjacent opposite sides of the voltage pole 3 near the pole face thereof. These arms 39 and 41 serve to divert a substantial proportion of the voltage flux produced by the voltage winding 27 away from the armature structure or disk 9, and they increase substantially the inductance of the voltage winding 27. It will be observed further that the arms 39 and 41 establish magnetic paths which are symmetric with reference to the voltage pole 3. This symmetry is for the purpose of assuring a uniform distribution of the voltage magnetic flux in the neighborhood of the voltage pole face.

It is believed that the operation of the structure thus far described is apparent from the foregoing description. The structure of the watthour meter 1 thus far described is well known in the art. If desired, an overload shunt 43 may be positioned between the current poles 5 and 7 for diverting current magnetic flux away from the disk 9. As well understood in the art, this shunt is designed to saturate or operate with decreasing magnetic permeability above a predetermined value of current passing through the windings 29 and 31 in order to improve the accuracy of the watthour meter operation.

As previously pointed out, the effect of lubricant employed in one or both bearings of the watthour meter is to apply a drag or retarding force to the disk 9. This retarding force is not constant but varies as a function of temperature. The effect of the retarding force on the operation of the watthour meter may be understood more clearly by reference to Fig. 3.

In Fig. 3, curves are shown representing the performance of the watthour meter 1. These curves represent percent error in registration of the watthour meter plotted as ordinates against the load measured by the watthour meter as abscissae. The ideal characteristic of the watthour meter 1 is represented by a curve A which exhibits no error at any value of the load measured by the watthour meter.

If the watthour meter 1 is adjusted to approximate as close as possible the characteristic represented by the curve A, a drop in the temperature of the watthour meter will result in a new characteristic curve B. It will be observed that the characteristic curve B droops appreciably in the light load region. This droop indicates that the watthour meter 1 is running too slowly and is registering incorrectly. The droop is caused by the increase in retarding force applied to the disk 9 by the lubricant for the bearing 13. As previously pointed out, this retarding force increases substantially with a decrease in temperature of the watthour meter. Since the retarding force represents a small percentage of the higher load values measured by the watthour meter 1, the effect thereof on the accuracy of the watthour meter is insignificant for higher load values. At light load values, however, the retarding force is an appreciable percentage of the load measured by the watthour meter and results in a substantial error in the performance thereof.

In order to compensate the watthour meter 1 for errors introduced by the aforesaid retarding force, it is desirable that an auxiliary force be applied to the disk 9 which is equal and opposite to the retarding force. This auxiliary force is represented by a curve C shown by a dotted line in Fig. 3. It will be observed that the curve C substantially balances the droop in the curve B and provides a resultant performance of the watthour meter 1 which is represented substantially by the curve A.

Production of the auxiliary force represented by the curve C is effected by positioning a magnetic member 45 in one of the magnetic paths completed by the arms 39 and 41. This magnetic member modifies the symmetry of the magnetic paths established by the arms 39 and 41 and results in a non-uniform distribution of voltage flux in the voltage pole adjacent the voltage pole face. The effect of this non-uniform distribution of magnetic flux is to apply an auxiliary force to the disk 9. Depending upon the particular effect desired, the magnetic member 45 may be positioned on either side of the voltage pole 3 to produce an auxiliary force urging the disk 9 in either direction. In the specific embodiment herein set forth, the magnetic member 45 is positioned between the voltage pole 3 and the arm 41 to produce an auxiliary force urging the disk 9 in the direction of the arrow 35. Consequently, the auxiliary force tends to compensate for the retarding force produced by the drag of the lubricant in the bearing 13.

To provide complete compensation for the retarding force, the auxiliary force produced by the magnetic member 45 should vary as a function of temperature. This variation may be effected by forming the magnetic member 45 of a material having a substantial temperature coefficient of magnetic permeability. By forming the magnetic member 45 of a material having a substantial negative temperature coefficient of permeability, the auxiliary force increases substantially as the temperature of the magnetic member decreases. By properly proportioning the magnetic member, the auxiliary force varies in magnitude with temperature sufficiently to compensate substantially for the retarding force produced by the drag of the lubricant in the bearing 13. Magnetic materials having substantial negative temperature coefficients of permeability are well known in the art. These materials comprise generally an iron alloy containing approximately 30% of nickel which is suitably heat treated. Nickel-copper alloys also are employed for this purpose. The characteristics of the material employed for the magnetic member 45 may be depicted by a curve as shown in Fig. 4, wherein ordinates represent permeability and abscissae represent temperature of the material. It will be observed that as the temperature drops from 60° C. above zero to 20° C. below zero, the permeability of the material increases substantially.

The magnetic member 45 conveniently may be formed of a strip of the desired material which is wedged between the arm 41 and the voltage pole 3. Other means for mounting the material in position and other shapes thereof may be employed as desired.

It is believed that the operation of the invention is clear from the above discussion. The magnetic member 45 is proportioned to provide an auxiliary force urging the disk 9 in the direction of the arrow 35 which varies in magnitude with the temperature of the magnetic member substantially at the same rate as the corresponding variation in the retarding force produced by the drag of the lubricant in the bearing 13. If the light load adjustment plate 37 is then adjusted to provide the desired light load characteristics at a predetermined temperature, the same characteristics will be obtained over a substantial range of temperature variation.

By following the teachings of this invention an electromotive device, such as a watthour meter, may be compensated substantially for errors, which vary with the temperature thereof. Although the invention has been described with reference to certain specific embodiments thereof, numerous modifications are possible. Therefore, the invention is to be restricted only by the appended claims when interpreted in view of the prior art.

I claim as my invention:

1. In a measuring device, a magnetic structure having a plurality of magnetic pole elements defining an air gap, means effective when energized for directing magnetic flux through said pole elements to establish a shifting magnetic field in said air gap, an electroconductive armature structure positioned in said air gap, bearing means mounting said electroconductive armature structure for movement in said air gap under the influence of said shifting magnetic field, said measuring device including means introducing a force component varying as a function of temperature and acting to modify the correct movement of said armature structure, and means compensating said measuring device for errors introduced therein by said force component, said compensating means including a magnetic member cooperating with one of said pole elements and positioned asymmetrically with respect to the pole face of said one of said pole elements to vary the flux distribution in said pole face in an asymmetric pattern for producing an auxiliary shifting magnetic field in said air gap to oppose the effect of said force component on said armature structure, said magnetic member having a substantial temperature coefficient of permeability for varying said auxiliary shifting magnetic field with temperature sufficiently to compensate said force component over a substantial range of temperature variation.

2. In an electrical watthour meter for measuring energy flowing in an electrical circuit, a magnetic core having a voltage pole element and current pole elements spaced to define an air gap, means for producing in said air gap a shifting magnetic field, said means including means effective when suitably energized for producing voltage and current magnetic fluxes in said pole elements, an electroconductive armature structure, means mounting said armature structure for rotation in said air gap under the influence of said shifting magnetic field, said mounting means including means opposing rotation of said armature structure with a retarding force which increases for a decrease in temperature, and compensating means for compensating errors introduced in said watthour meter by said retarding force, said compensating means comprising light load adjusting means for adjusting the torque applied to said armature structure at a light loading of said watthour meter, and a magnetic member positioned adjacent the pole face of said voltage pole element for diverting a portion of the magnetic flux flowing in said voltage pole element away from said armature structure, said magnetic member being positioned asymmetrically relative to the pole face of said voltage pole to produce an auxiliary shifting magnetic field in said air gap acting on said armature structure in opposition to said retarding force, and said magnetic member having a substantial negative temperature coefficient of permeability, whereby said auxiliary shifting magnetic field decreases for an increase in temperature of said watthour meter.

3. In an electrical watthour meter for measuring energy flowing in an electrical circuit, a magnetic core having a voltage pole element and current pole elements spaced to define an air gap, means for producing in said air gap a shifting magnetic field, said means including means effective when suitably energized for producing voltage and current magnetic fluxes in said pole elements, an electroconductive armature structure, means mounting said armature structure for rotation in said air gap under the influence of said shifting magnetic field, said magnetic core including bypass means symmetrically disposed relative to the pole face of said voltage pole element in the direction of movement of said armature structure relative thereto for diverting a portion of the voltage magnetic flux away from said armature structure, said mounting means including means opposing rotation of said armature structure with a retarding force which increases for a decrease in temperature, and compensating means for compensating errors introduced in said watthour meter by said retarding force, said compensating means comprising light load adjusting means for adjusting the torque applied to said armature structure at a light loading of said watthour meter, and a magnetic member positioned in a magnetic path defined by said bypass means asymmetrically relative to the pole face of said voltage pole element for applying an auxiliary force to said armature structure acting in opposition to said retarding force, said magnetic member having a substantial negative temperature coefficient of permeability, and said magnetic member being proportioned to effect a temperature responsive variation of said auxiliary force substantially similar to that of said retarding force.

4. In an electrical watthour meter for measuring energy flowing in an electrical circuit, an electroconductive armature structure, means mounting said electroconductive armature structure for rotation in said air gap, said mounting means including means opposing rotation of said armature structure with a retarding force which increases for a decrease in temperature thereof, means associated with said magnetic core for producing in said air gap a shifting magnetic field operating to rotate said armature, said magnetic core comprising a voltage pole element having a pole face positioned adjacent said armature structure, and a pair of magnetic arms terminating adjacent opposite sides of said voltage pole element for establishing magnetic paths diverting voltage magnetic flux flowing therethrough away from said armature structure, a magnetic member having a negative temperature coefficient of permeability positioned in one of said magnetic paths for controlling the symmetry thereof relative to said voltage pole face, said magnetic member being proportioned for producing a temperature responsive auxiliary shifting magnetic field in said air gap to apply to said armature structure an auxiliary force opposing said retarding force over a substantial range of temperature variation, and light load adjusting means for adjusting the torque applied to said armature structure at a light loading of said watthour meter.

5. In an electrical watthour meter for measuring energy flowing in an electrical circuit, a magnetic core having a voltage pole element and current pole elements positioned with their pole faces defining an air gap, said magnetic core being designed to provide a pair of symmetrically arranged magnetic paths terminating adjacent opposite sides of the pole face of said voltage pole element for diverting a portion of the voltage magnetic flux flowing in said voltage pole element away from said air gap, means for producing in said air gap a shifting magnetic field moving across the pole face of said voltage pole element from one of said sides towards the other of said sides and dependent on the value of the energy to be measured, an electroconductive armature structure, means mounting said armature structure in said air gap for rotation under the influence of said shifting magnetic field, said mounting means including means opposing rotation of said armature structure with a retarding force which increases for a decrease in the temperature of said watthour meter, and means compensating said watthour meter for errors introduced by said retarding force, said compensating means comprising a magnetic member having a negative temperature coefficient of permeability positioned in one of said magnetic paths for modifying the symmetry of said magnetic paths relative to the pole face of said voltage pole element, the modification of the symmetry of said magnetic paths being designed to produce a shifting magnetic field component acting in opposition to, and substantially balancing said retarding force over a substantial range of temperature variation, and light load adjusting means for adjusting the torque applied to said armature structure at a light loading of said watthour meter.

THOMAS D. BARNES.